United States Patent [19]
Ben-Michael et al.

[11] Patent Number: 6,078,565
[45] Date of Patent: Jun. 20, 2000

[54] METHOD AND APPARATUS TO EXPAND AN ON CHIP FIFO INTO LOCAL MEMORY

[75] Inventors: Simoni Ben-Michael, Givat Zeev; Michael Ben-Nun, Ramot Ayalon; Yifat Ben-Shahar, Mevaseret Zion, all of Israel

[73] Assignee: Digital Equipment Corporation, Houston, Tex.

[21] Appl. No.: 08/879,359

[22] Filed: Jun. 20, 1997

[51] Int. Cl.[7] .................................. H04L 12/28; H04J 1/16
[52] U.S. Cl. ............................................. 370/236; 370/412
[58] Field of Search ..................................... 370/231, 236, 370/235, 382, 395, 397, 412, 413, 428, 429; 395/200.8, 826, 849

[56] References Cited

U.S. PATENT DOCUMENTS

| | | | |
|---|---|---|---|
| 5,483,526 | 1/1996 | Ben-nun et al. | 370/395 |
| 5,511,076 | 4/1996 | Ramakrishnan et al. | 370/423 |
| 5,572,522 | 11/1996 | Calamvokis et al. | 370/390 |
| 5,633,867 | 5/1997 | Ben-nun et al. | 370/399 |
| 5,649,110 | 7/1997 | Ben-nun et al. | 395/200.19 |

*Primary Examiner*—Chau Nguyen
*Assistant Examiner*—Chiho Andrew Lee
*Attorney, Agent, or Firm*—Cesari and McKenna

[57] ABSTRACT

A relatively small FIFO queue is located on a semiconductor chip receiving and transmitting data in a computer system, typically a computer network. The FIFO queue has additional storage capability in the form of an expansion into the local memory of the computer system. The front and back ends of the FIFO, which are involved in receiving and transmitting data, are implemented on the chip. The FIFO expands into the space provided in the local memory only when the on-chip portion of the FIFO is full. The middle portion of the FIFO resides in expansion in the local memory. The local memory is accessed only in bursts of multiple credits, both for read transactions and for write transactions.

9 Claims, 9 Drawing Sheets

METHOD AND APPARATUS TO EXPAND AN ON CHIP FIFO INTO LOCAL MEMORY

FIELD OF THE INVENTION

This invention relates generally to computers, and more particularly to expanding an on-chip FIFO into local memory.

BACKGROUND OF THE INVENTION

In a computer network, or in a switching network, credit based flow control is used to control the amount of data transmitted by a source node so that there is always a buffer available in the destination node to hold the data. Frequently the data is divided into discrete packets. In some systems, such as the Asynchronous Transfer Mode (ATM) protocol for transferring data in a computer network, the data is placed into cells. ATM cells are 53 bytes in length, with 48 of the bytes carrying data and 5 of the bytes comprising a header. When a message larger than 48 bytes is transferred from a source node to a destination node, the source node first breaks down the larger message into 48 byte data cells, and the destination node later reassembles the 48 byte data cells into a received message identical to the transmitted message.

In some message transfer protocols, such as the ATM protocol, the intermediate nodes are switches. The switches route cells along virtual circuits (VCs). Each endstation which is a source node has a virtual circuit established to a destination endstation. The intermediate nodes, or switches, handle all of the virtual circuits which are routed through them. In a typical network established according to the ATM protocol, an intermediate node may have several thousands of virtual circuits routed through it.

Further, in some network protocols such as the ATM protocol, a cell which is lost at an intermediate node cannot be retransmitted by the source endstation because no mechanism is employed to track individual cells. Cells in the ATM protocol are simply transmitted in serial order. In the event that a cell is lost, the entire message is again broken down into cells and the sequence of cells again transmitted, according to the ATM protocol. Therefore, in a network established according to a protocol such as the ATM protocol, it is important to keep intermediate nodes from losing cells.

To prevent loss of cells, hop-by-hop credit based flow control is introduced to control the transmission rate of each source station. For purposes of flow control, the source station may be an end station, or alternatively, the source station may be an intermediate node transmitting cells to a downstream intermediate node.

In credit based flow control, a virtual circuit is first assigned a number of credits which can be outstanding at any time. A credit, when held by a source node gives that source node permission to transmit one cell. When the cell is received by the destination node, the destination node keeps the credit until a buffer in the destination node which has received the cell is cleared of the received cell. After the buffer is cleared, the destination node returns a credit to the source node, thereby giving the source node permission to send another cell on that virtual circuit.

The number of outstanding credits assigned to a virtual circuit is chosen to permit the virtual circuit to operate at full available bandwidth. Thus, the number of outstanding credits assigned to the virtual circuit must be enough to fill the virtual circuit pipe during a round trip time period, plus an additional number to account for processing delays at the destination node. For example, the number of credits assigned to a virtual circuit may be on the order of ten (10) credits per virtual circuit.

In hop-by-hop credit based flow control, each intermediate node and the next downstream destination node maintains credit based flow control in order to ensure that the next downstream destination node has a buffer available to receive the next cell.

A problem arises when an intermediate node has thousands of virtual circuits, for example, with tens of credits assigned to each virtual circuit. The destination node stores the number of credits to be returned in each virtual circuit. A data structure to store the number of credits to be returned in each virtual circuit contains the virtual circuit number which may be 12 bits up to 24 bits. The memory requirement to hold a data structure of this size may run to 50,000 to 100,000 thousand bytes, or more.

A further problem is that the list of virtual circuits must be accessible in one cell time. That is, as a cell is being received, the list of credits must be updated. Fast access requires that the list of credits be implemented in a VLSI chip, where the VLSI chip implements the logic used to implement the credit based flow control.

It is, however, very expensive to maintain thousands of kilobytes of storage in a chip which implements the logic of credit based flow control.

It remains desirable to have a convenient and inexpensive way to maintain a list of credits to be returned in thousands of virtual circuits, and to have fast access to the list.

SUMMARY OF THE INVENTION

The problems of maintaining a list of credits for many virtual circuits are solved by the present invention of a first-in-first-out (FIFO) queue and a FIFO queue expansion.

A FIFO queue receives and transmits data to the virtual circuits. The front end of the FIFO queue, where data is written, and the back end of the FIFO queue, where data is read, reside preferably on a semiconductor chip. The FIFO has additional storage capability in the form of an expansion in a local memory, where the middle portion of the FIFO resides. Local memory is memory located off the chip. The expansion in the local memory is accessed only when the on-chip portions of the FIFO are full. The local memory is accessed in bursts of multiple bytes of data, both for read transactions and for write transactions.

The portion of the queue implemented in VLSI, i.e. implemented on the chip, allows rapid access to memory for reading and writing. Data access to a local memory, e.g. a dynamic random access memory (DRAM), involves a delay or a latency which is inherent to the local memory. Generally, there is an additional delay in accessing the local memory due to the fact that the local memory is shared with other tasks. A memory arbiter arbitrates among the tasks causing a delay where other tasks take priority over reading or writing to the queue.

Placing the front and back ends of the FIFO queue on a chip enables rapid access to the queue. Creating an expansion in local memory enables a large storage capacity for the queue. Storing the middle portion of the queue in the expansion allows the delays in access to the local memory to be tolerated because the middle portion of the queue does not require rapid access. Reading or writing multiple bytes of data to the local memory expansion further reduces the impact of the local memory latency on queue operation.

BRIEF DESCRIPTION OF THE DRAWINGS

The present invention together with the above and other advantages may best be understood from the following detailed description of the embodiments of the invention illustrated in the drawings, wherein.

DETAILED DESCRIPTION

Figure 1:
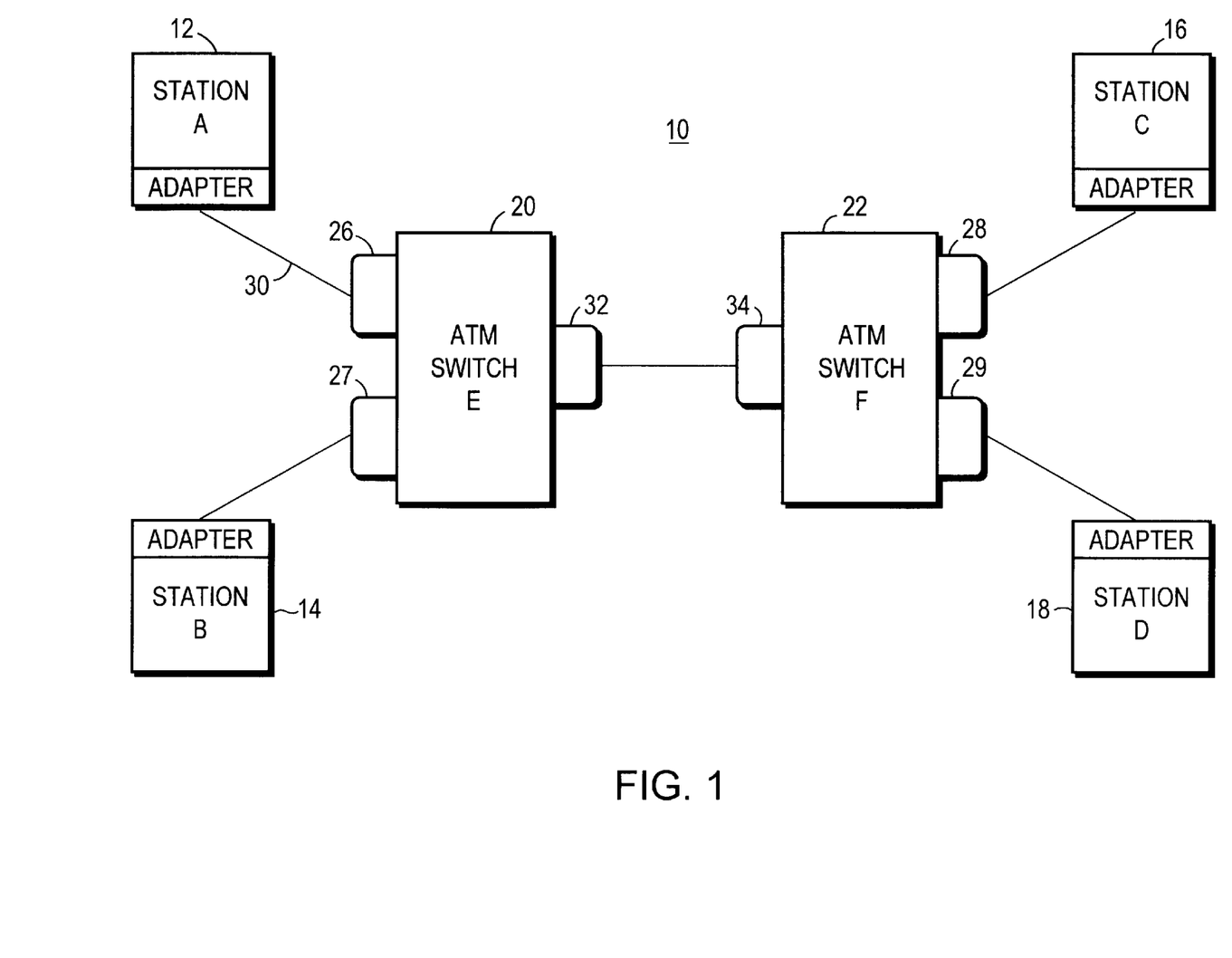
FIG. 1 is a block diagram of a computer network.

FIG. 1 shows an exemplary asynchronous transfer mode (ATM) local area network (LAN) 10 which includes four stations, A 12, B 14, C 16, and D 18. The ATM LAN 10 also includes ATM switch E 20 and ATM switch F 22. An ATM adapter resides in each of the stations 12, 14, 16, 18. The ATM switches also have ports 32, 34, each port dedicated to the switch of the other port. The ATM adapter provides an interface between the stations 12, 14, 16, 18 and the switches 20, 22. The ATM switches have ports 26, 27, 28, 29 each dedicated to one of the stations 12, 14, 16, 18. By way of example, if station A 12 is transmitting packets for station C 16, the ATM adapter in station A 12 is involved in segmenting the data into cells, and affixing the appropriate fields in a cell header (of FIG. 2 and FIG. 3). The ATM adapter of station C 16 is involved in reassembling the cells received into a complete packet and delivering the packet to station C 16. Control of the ATM LAN 10 resides in the ATM switches E 20 and F 22, which route messages between the stations 12, 14, 16, 18 and control access in the event of congestion. For example, the station A 12 may send a cell over a line 30 to ATM switch E 20 through port 26. ATM switch E 20 will route the cell to a destination, station C 16, for example, according to a VCI/VPI in an ATM cell header (more fully described with reference to FIG. 2 and FIG. 3).

Because each port 26, 27, 28, 29 is dedicated to one of each of the stations 12, 14, 16, 18, the other stations do not have to contend for access to the ATM switches 20, 22. Thus, station A 12 has full access to the line 30 regardless of the activity of other stations with other such connections. For example, if a 5 Mb file is being transmitted from station A 12 to station C 16, it can move to the ATM switch E 20 in a continuous burst at the prescribed rate, possibly the full channel rate, instead of sharing the communication link in the other stations and having intervening frames from other stations as with other LANs, such as Ethernet, Token Ring, and Fiber Distributed Data Interface (FDDI) LANs.

Figure 2:
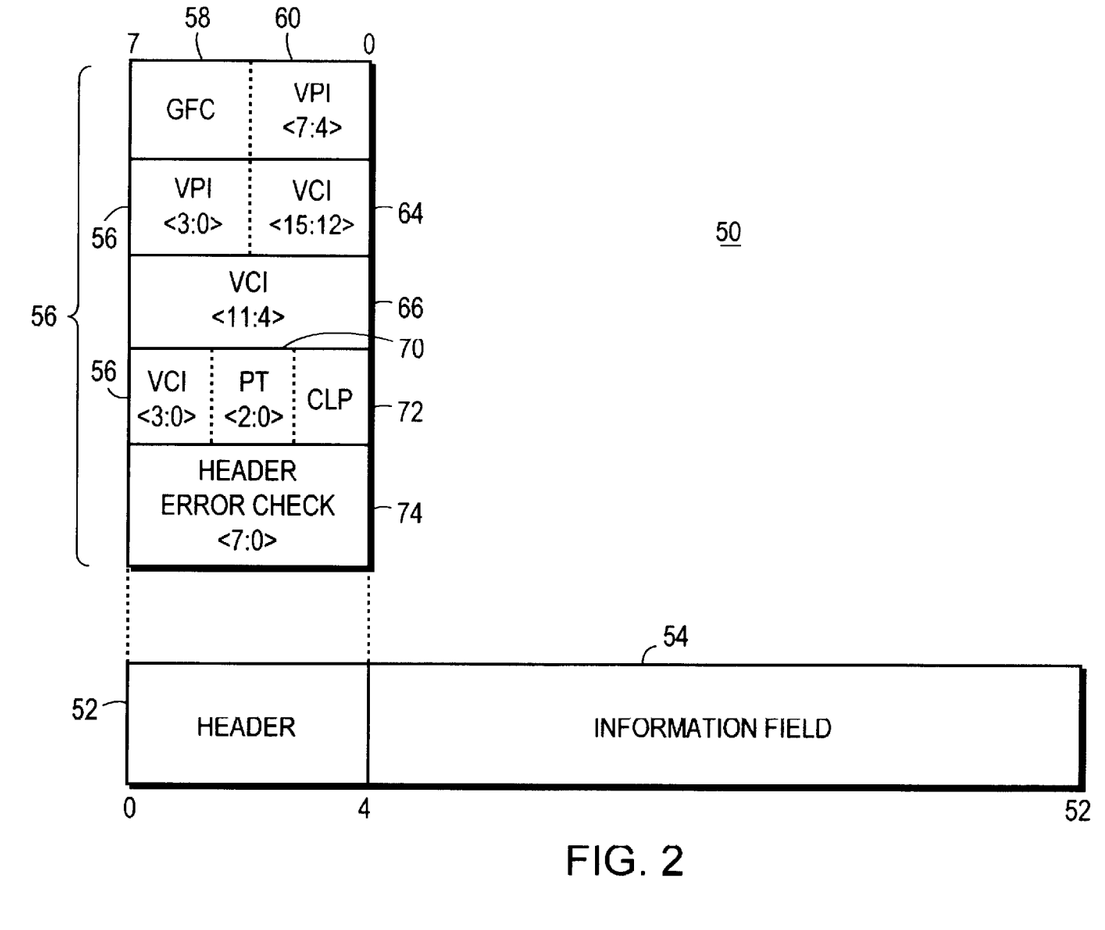
FIG. 2 is a diagram of an ATM cell.

Each message in the ATM LAN 10 is comprised of one or more fixed length units of data called ATM cells. Referring to FIG. 2, an ATM cell 50 is shown to be 53 bytes long. The ATM cell 50 is typically divided into a 5-byte header 52 and a 48-byte information field 54. The 5-byte header 52 contains several fields 56. Specifically, a first byte contains a generic flow control (GFC) field 58 and a part of a virtual path identifier (VPI) field 60. A second byte contains another part of the VPI field 62 and part of a virtual channel identifier (VCI) field 64. A third byte contains another part of the VCI field 66. A fourth byte contains the remaining part of the VCI field 68, a payload type identifier (PT) field 70, and a cell loss priority field (CLP) 72. A fifth byte contains a header error check 74.

The address of the ATM cell 50 is contained in the fields labeled VPI 60, 62 and VCI 64, 66, 68. This two-part identification allows the ATM LAN 10 to route data contained in the information field 54 between locations while maintaining the identity of individual circuits within a trunk.

Figure 3:
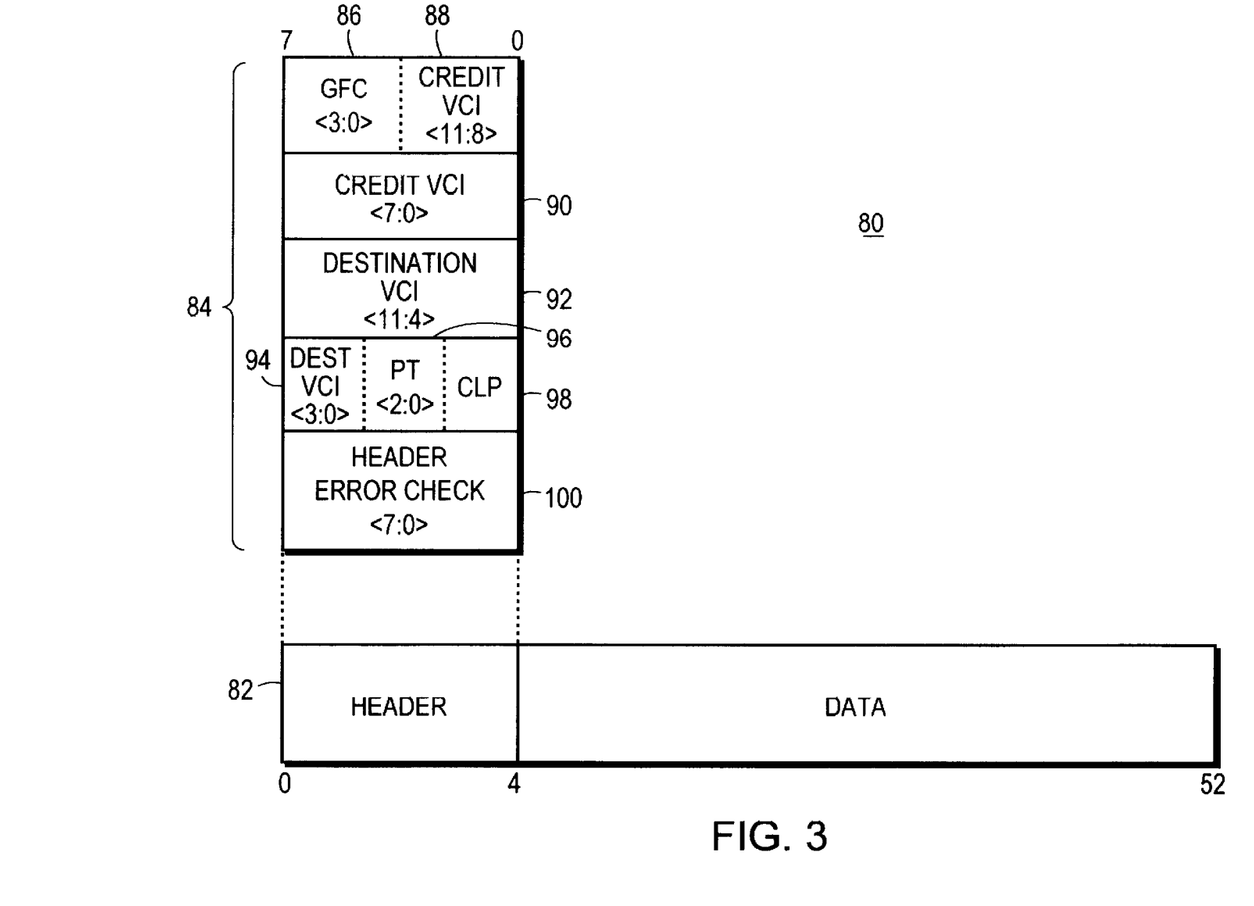
FIG. 3 is a diagram of an ATM cell used in credit-based ATM flow control.

FIG. 3 shows an ATM cell 80 used in a credit-based flow control system. The header 82 is 5 bytes long and contains several fields 84. Specifically, a first byte contains a GFC field 86 and a part of a credit virtual circuit identifier (credit VCI) 88. A second byte contains another part of a credit VCI 90. A third byte contains part of a destination VCI 92. A fourth byte contains a remaining part of the destination VCI 94, a PT field 96, and a CLP field 98. A fifth byte contains a header error check field 100.

The credit field of each arriving cell identifies the transmit virtual circuit (VC), which is given a new credit for transmission. The receiver, after moving the arriving cell out of its buffer should return a credit to the sender. The returned credit is attached to a cell transmitted from the receiver. The VC whose credit is returned is the one that the arrived cell was sent on, i.e. the value in the VCI field. Transmitting or receiving credits is done one credit per a cell. Potentially, an arriving cell may be a null cell, indicated by destination VCI=0. In this case, the cell is ignored and no credit is sent back. A transmitted cell is not carrying any credits if its credit value equals 0. If an arriving cell contains a credit for one of the transmit VCs (credit <>0), the credit balance of the transmit VC is incremented by one, and, if this VC had been stopped due to lack of a credit, the VC is restarted.

Figure 4:
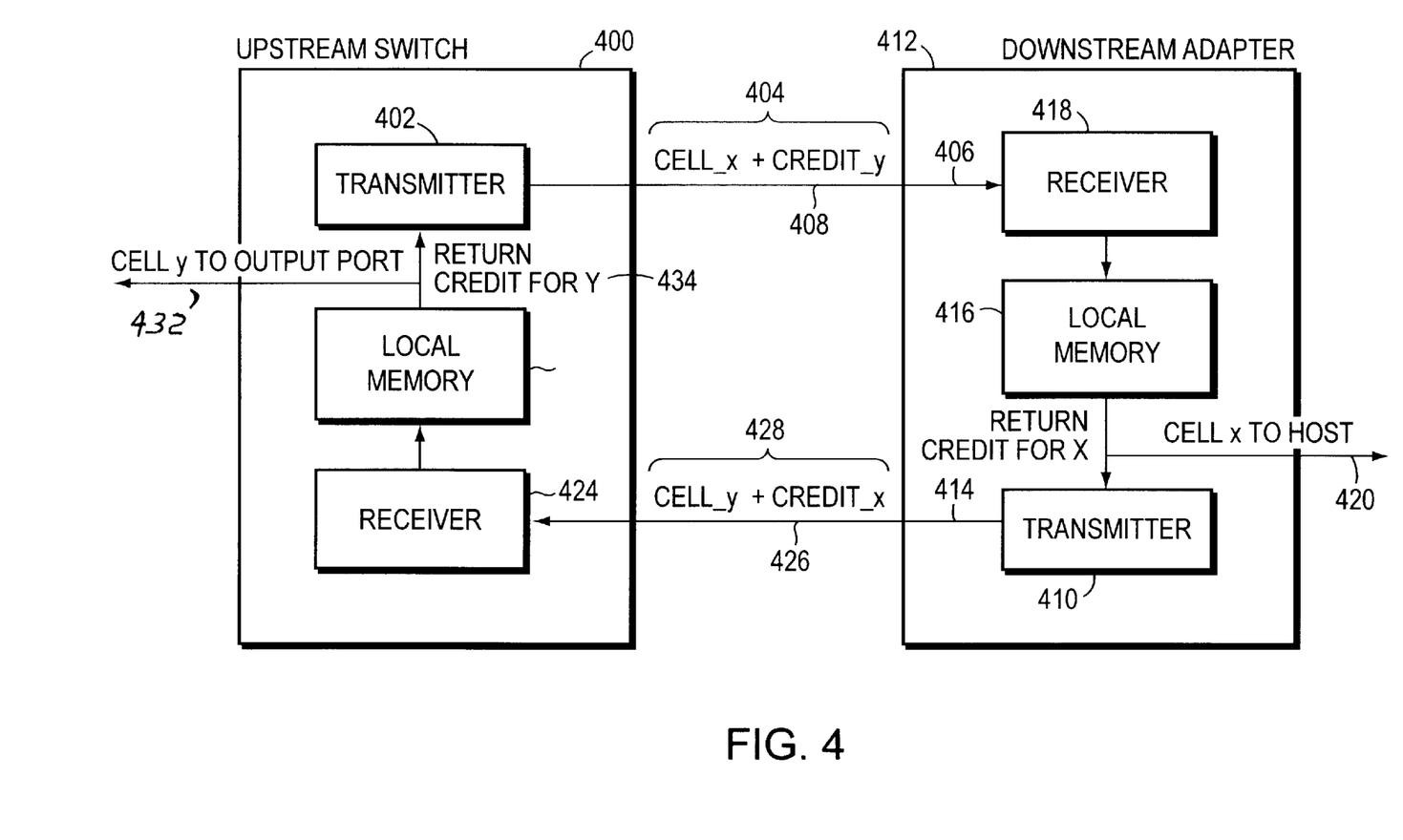
FIG. 4 is a diagram of credit-based ATM flow control.

In FIG. 4, an exemplary credit-based ATM flow control system is illustrated. In the exemplary credit-based ATM flow control system, a transmitter portion 402 of an upstream ATM switch 400 is sending an ATM cell 404 on virtual circuit identifier (VCI) 406. The credit field 408 in ATM cell 404 is carrying a credit for a transmitter portion 410 of a downstream ATM adapter 412 for VCI 414. A credit is simply an okay to send one ATM cell on a VCI, with the assurance that the cell will have a buffer at the remote end and hence not experience loss.

In the exemplary credit-based ATM flow control system of FIG. 4, when the downstream ATM adapter 412 moves the ATM cell 404 of VCI 406 from its local memory 416 from a receiver portion 418 and into a host memory 420, the downstream ATM adapter 412 generates a credit 426 for the transmitter portion 402 of the upstream ATM switch 400 to allow transmission of a new ATM cell (not shown) on VCI 406. Other adapter designs may return a credit 426 on receiving the ATM cell 404 and storing it in local memory 416. This credit for the transmitter portion 402 can be carried by any ATM cell transmitted by the transmitter portion 410 of the downstream ATM adapter 412 to a receiver portion 424 of the up-stream ATM switch 400. For example, in FIG. 4 a credit 426 for VCI 406 is carried on an ATM cell 428 on VCI 414.

The receiver portion 424 of the upstream ATM switch 400 receives the ATM cell 428 from the transmitter portion 410 of the downstream ATM adapter 412 and stores it in its local memory 430. The upstream ATM switch 400 uses the credit 426 to transmit another cell on VCI 406. When the upstream ATM switch 400 moves the ATM cell 428 from its local memory 430 to one of its output ports 432, the upstream ATM switch 400 generates a credit 434 for VCI 414, which will be carried by any ATM cell transmitted towards the downstream ATM adapter 412.

In order to be able to maintain a full link speed for each virtual circuit, it is necessary to provide each transmit VC with an adequate initial fixed number of credits. The number of initial credits for each VC is typically set to be sufficient for the VC to flow at the full link rate. The number of initial credits must also be sufficient for the first cell sent in a given burst of cells to have its credits returned to the sender before the sender exhausts its initial credits, if there is no contention from any other VC on the link. In other words, the number of initial credits should be large enough to ensure that the transmitter portion 402 of an upstream ATM switch 400 will not stop transmitting before the upstream ATM switch 400 receives a first credit from the transmitter portion 410 of the downstream ATM adapter 412. Thus, the receiver portion 418 of the downstream ATM adapter 412 should have enough local memory 416 to accommodate a number of cells corresponding to the transmission of initial credits given to the upstream ATM switch 400. That is, the receiver needs to have enough buffering to accommodate for the transmitter initial credits given because of the credits' travel round trip delay.

Figure 5:
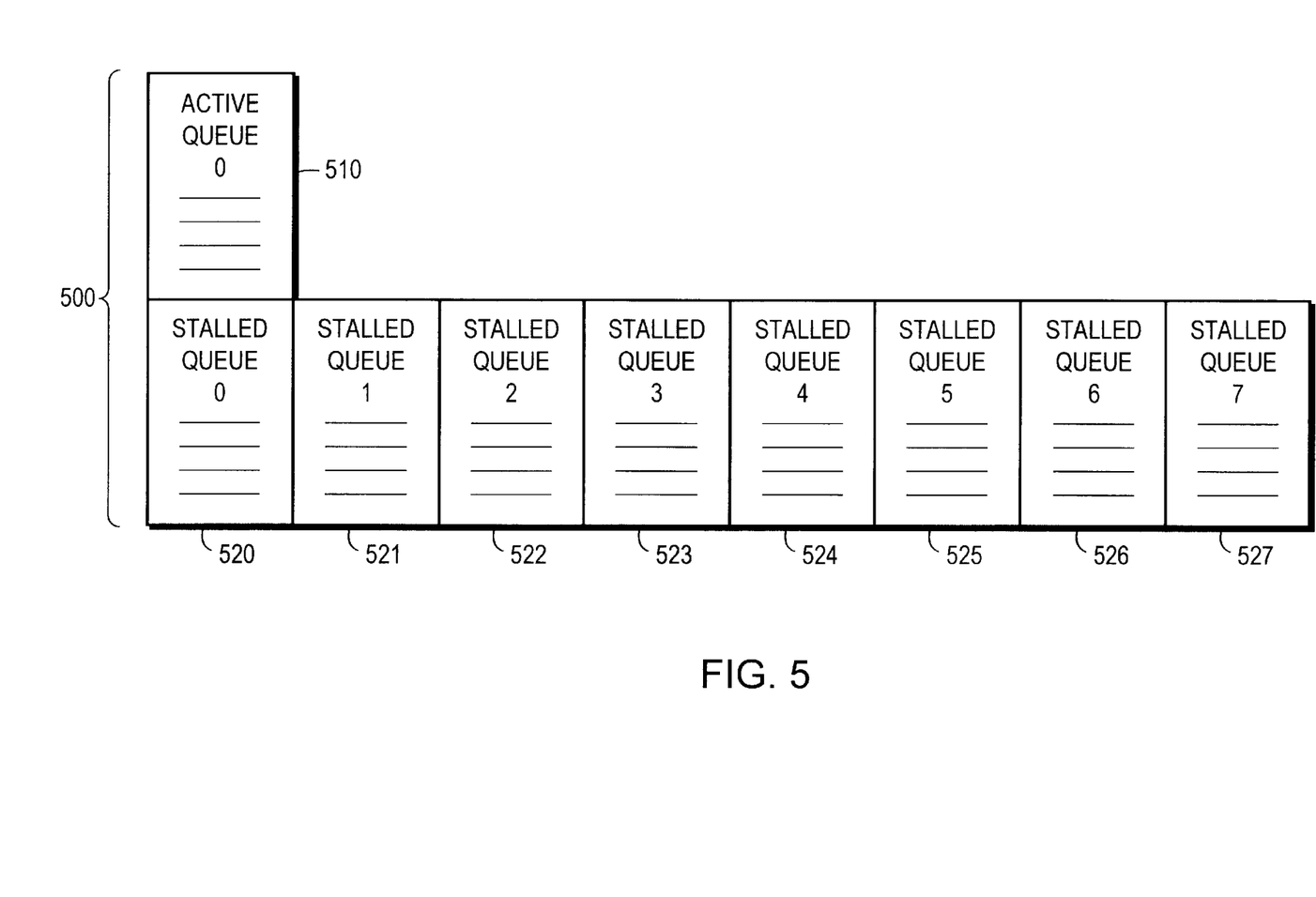
FIG. 5 is a diagram of the receiver portion of the downstream adapter of FIG. 4.

FIG. 5 shows the receiver portion of the downstream adapter 412 of FIG. 4. The receiver portion 418 of the downstream adapter 412 has nine queues 500 for packet reassembly implemented in its local memory 416. The nine queues 500 consist of one active queue 510 and eight stalled queues 520–527. The adapter's host has receive host queues for receiving assembled packets from the adapter. When a packet is reassembled, it is merely placed on one of the receive host queues.

When the downstream ATM adapter 412 receives in its receiver portion a first ATM cell for a particular VC (VC 106 for example), the downstream ATM adapter 412 has two choices. The downstream ATM adapter may enqueue the VC 106 into the active queue 510, or the downstream ATM adapter 412 may enqueue the VC 106 into one of the eight stalled queues 520–527.

The transmitter portion 410 of the downstream ATM adapter 412 will always return credits to a VC which is placed in the active queue 510. As long as the VC is queued in the stalled queue, credits will be kept in the downstream ATM adapter 412 and will be returned to the upstream switch only when the VC is dequeued from the stalled queue and enqueued into the active queue 510.

Figure 6:
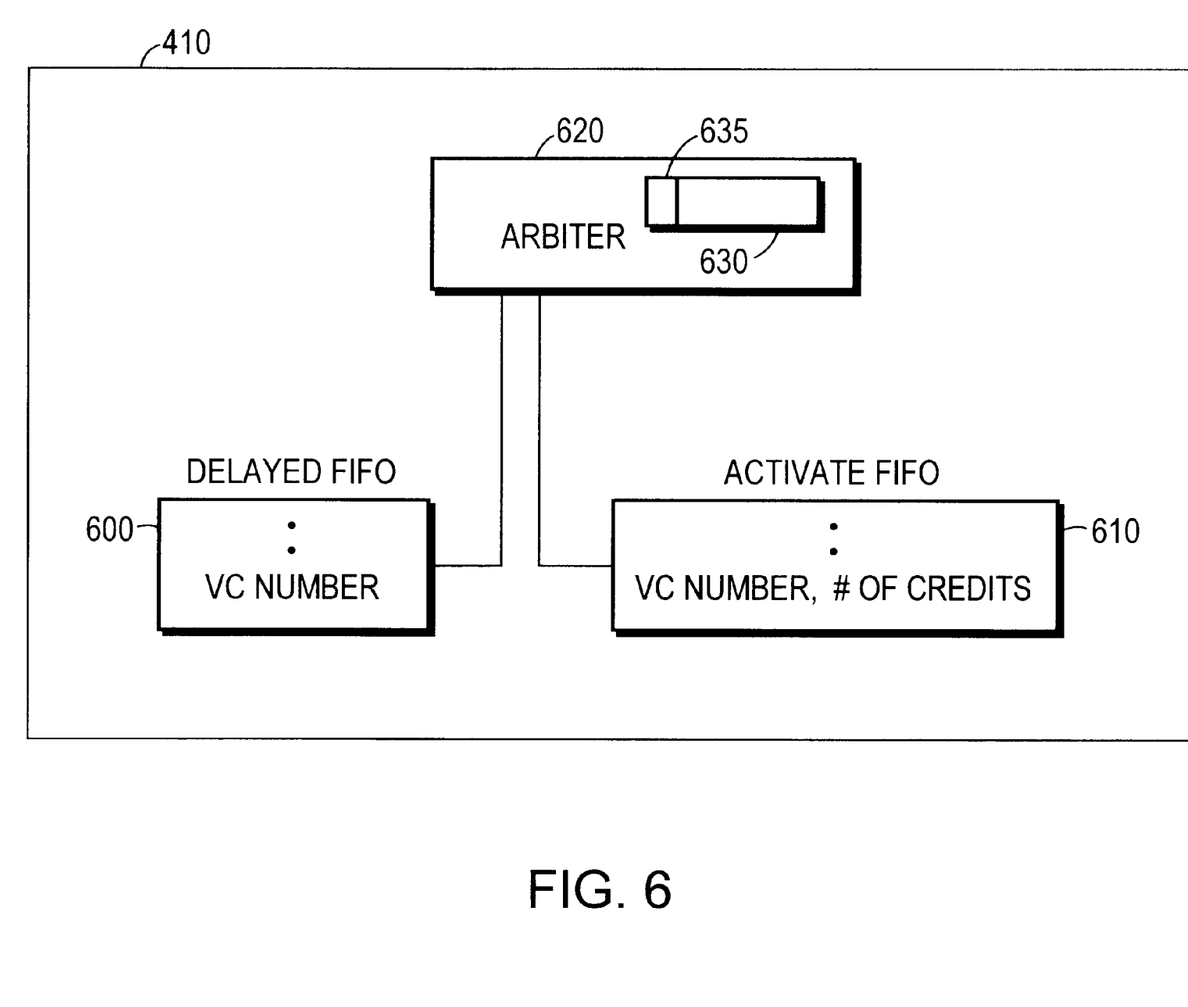
FIG. 6 is block diagram of the credit-return mechanism used by the downstream adapter of FIG. 4.

FIG. 6 shows the transmitter 410 of the downstream adapter 412. In order to handle large numbers of credits, the downstream adapter transmitter 410 has two first-in-first-out queues (FIFOs) 600, 610 and an arbiter 620. The two FIFOs are a credit delayed FIFO 600 and an activate FIFO 610. The arbiter 620 has a Command and Status Register (CSR) 630 which controls movement of credits in the FIFOs. The CSR 630 has a programmable control bit 635. The downstream adapter 412 uses the arbiter 620 to decide which FIFO to use in returning credits. The credit delayed FIFO 600 is a large FIFO used to store credits that are delayed. Only one credit is returned per cell that is transmitted. Whenever the adapter 412 decides to return credits from the activate FIFO 610, the regular flow of returning credits is put temporarily in the credit delayed FIFO 600. The credit delayed FIFO 600 holds the VC number as the credit (one credit per entry). The activate FIFO 610 is used to store credits that are scheduled to be returned when the VC was moved from a stalled queue 520–527 to the active queue 510. All the credits that were stalled during the time that VC was in a stall queue 520–527 are put in one entry in the activate FIFO 610. An entry on the activate FIFO 610 holds the VC number and the VC_Credit_count values.

Figure 7:
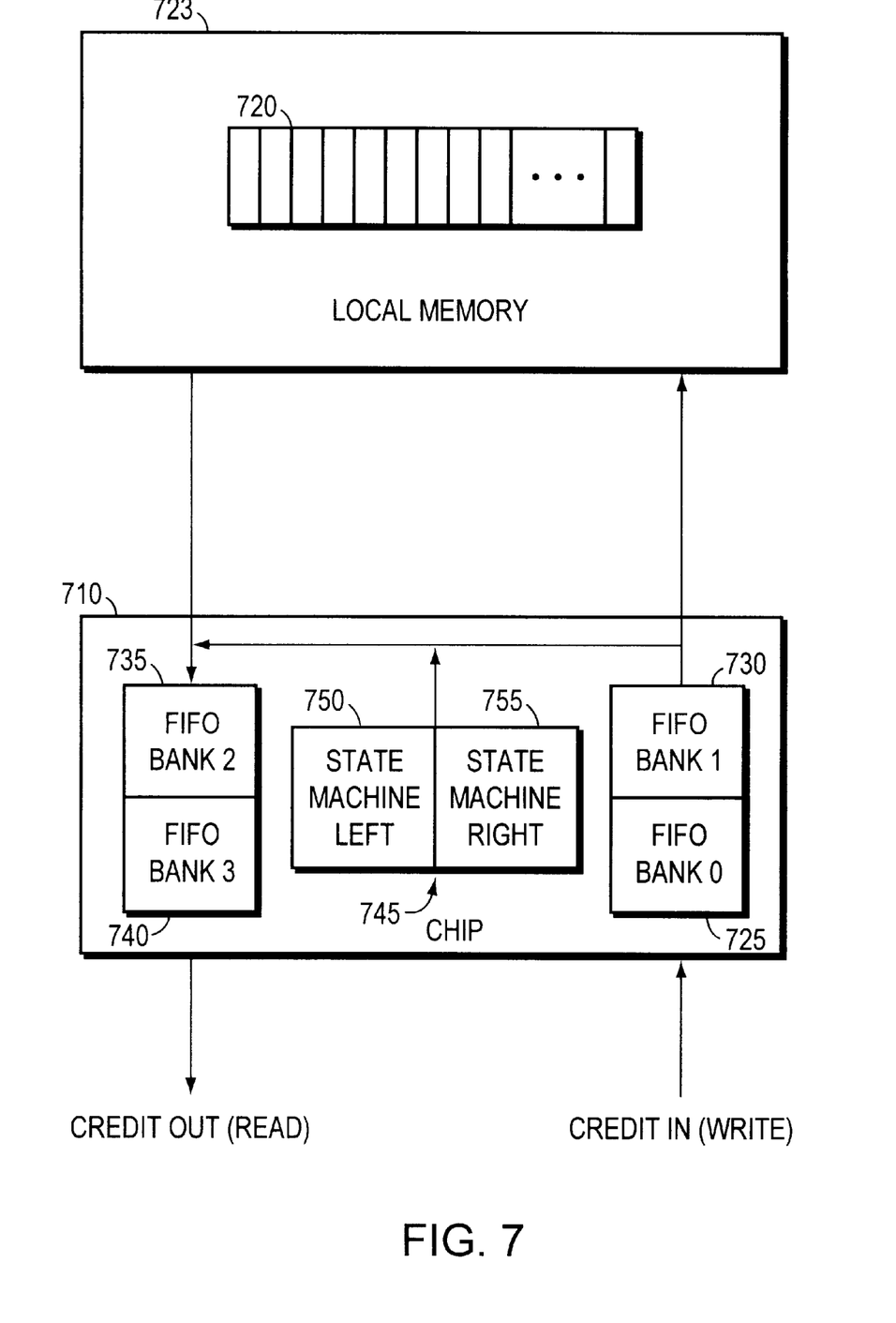
FIG. 7 is a block diagram of the delayed FIFO.

FIG. 7 shows the delayed FIFO 600. The delayed FIFO 600 is divided into two major parts: components residing on the chip 710, and a local memory expansion 720 residing in the local memory 723. The components on the chip 710, are a memory and a controller 745. In the present embodiment of the invention, the memory is one sequential memory which is divided into four logical banks 725, 730, 735, 740, each containing up to 16 credits. In alternative embodiments of the invention, the memory on the chip 710 may be divided into more, or fewer, than four logical banks.

The front end of the delayed FIFO 600, where data is written, and the back end of the delayed FIFO 600, where data is read, reside on the chip 710. The delayed FIFO 600 has additional storage in the expansion 720 in the local memory 723, where the middle portion of the delayed FIFO 600 resides. The local memory expansion 720 is accessed only when the on-chip portions of the delayed FIFO 600 are full. The local memory expansion 720 is accessed in bursts of multiple bytes of data, i.e. a bank of data is moved, both for read transactions and for write transactions.

The portion of the delayed FIFO 600 implemented on the chip 710 allows rapid access to memory for reading and writing. Data access to the local memory 723 involves a delay or a latency which is inherent to the local memory 723. Generally, there is an additional delay in accessing the local memory 723 due to the fact that the local memory 723 is shared with other tasks. An arbiter 620 arbitrates among the tasks causing a delay where other tasks take priority over reading or writing to the delayed FIFO 600.

Placing the front and back ends of the delayed FIFO queue 600 on the chip 710 enables rapid data access to the delayed FIFO 600. The local memory expansion 720 provides a large storage area for the delayed FIFO 600. Storing the middle portion of the delayed FIFO 600 in the local memory expansion 720 allows the delays in access to the local memory 723 to be tolerated because the middle portion of the delayed FIFO 600 does not require rapid access. Reading or writing banks of data to the local memory expansion 720 further reduces the impact of the local memory latency on the operation of the delayed FIFO 600.

In the present implementation of the invention, the chip memory is a Static Random Access Memory (SRAM). The SRAM is divided physically into four consecutive parts to form the logical banks. Each one of the four physical parts is actually a small FIFO with a read and write pointer.

The delayed FIFO 600 receives credits for VCs that are in the active queue 510 and which should be returned immediately. In the present implementation of the invention, the credits are to be returned in the same order that their respective cells arrived.

The delayed credit FIFO 600 has a controller 745 which controls the state of the FIFO 600. The controller 745 is composed of two state machines 750, 755: a first state machine 755 which controls the right banks 725, 730 (0 and 1), and a second state machine 750 which controls the left banks 735, 740 (2 and 3).

Credits are continuously being written to the right banks 725, 730. The state machine 755 which controls the right banks 725, 730 is responsible for regulating space for more credits to be written into the right banks. The state machine 755 accomplishes this by moving a full bank when one of the right banks is full and the other right bank reaches a threshold value. The state machine 755 moves the full bank to the left if the left banks are empty and to the local memory expansion 720 if the left banks are not empty.

Once the local memory expansion 720 contains data, credits are read only from the left banks 735, 740. The state machine 750 which controls the left banks 735, 740 is responsible for keeping these banks full of credits to be read. The state machine accomplishes this by copying a slot from the local memory expansion 720 to an empty left bank 735, 740 when one of the left banks is empty.

In addition to the two state machines 750, 755, there is a pointer which points to the part 725, 730, 735, 740 (right or left banks) of the delayed FIFO 600 from which credits are being read. This pointer indicates the left banks when either one of the left banks is not empty, or when the local memory expansion 720 is not empty.

The local memory expansion 720 in the local memory 723 is divided into m slots. In the exemplary implementation, each slot contains 16 credits (8 longwords, which is the exact size of a full bank). An up/down counter counts the number of slots in the local memory 723 which are in use.

The arbiter 620 uses a dynamic 1-of-N arbitration (1 from the activate FIFO 610, N from the delayed FIFO 600) where N gets bigger as the number of occupied entries in the delayed FIFO 600 gets bigger, illustrated in Table 1. This gives priority to the delayed FIFO 600 but prevents possible service starvation of the activate FIFO 610.

TABLE 1

| Activate FIFO | Delayed FIFO | Condition |
| --- | --- | --- |
| 1 credit | 32 credits | FIFO expansion empty |
| 1 credit | 64 credits | 0 < FIFO exp. < 4K |
| 1 credit | 128 credits | 4K < FIFO exp. < 8K |
| 1 credit | 256 credits | 8K < FIFO exp. < 16K |
| 0 credits | Full priority | 16K < FIFO expansion |

The dynamic 1-of-N arbitration works as follows. In the case where the local memory expansion 720 in the local memory 723 is empty, one credit from the activate FIFO 610 is returned for every 32 credits returned from the delayed FIFO 600. In the case where the local memory FIFO expansion 720 is not empty but has fewer than 4K credits, one credit is returned from the activate FIFO 610 for every 64 credits returned from the delayed FIFO 600. In the case where the number of credits in the local memory FIFO expansion 720 is between 4K and 8K, one credit is returned from the activate FIFO 610 for every 128 credits returned from the delayed FIFO 600. In the case where the number of credits in the local memory FIFO expansion 720 is between 8K and 16K, one credit is returned from the activate FIFO 610 for every 256 credits returned from the delayed FIFO 600. Where there are more than 16K credits in the local memory FIFO expansion 720, the delayed FIFO 600 gets full priority over the activate FIFO 610.

In addition, the programmable bit 635 in the Command and Status Register 630 (CSR) which, when set, will force the arbiter 620 to return credits from the delayed FIFO 600 only as long as it is not empty. This mode gives a higher fixed priority to the delayed FIFO 600 over the activate FIFO 610.

Figure 8:
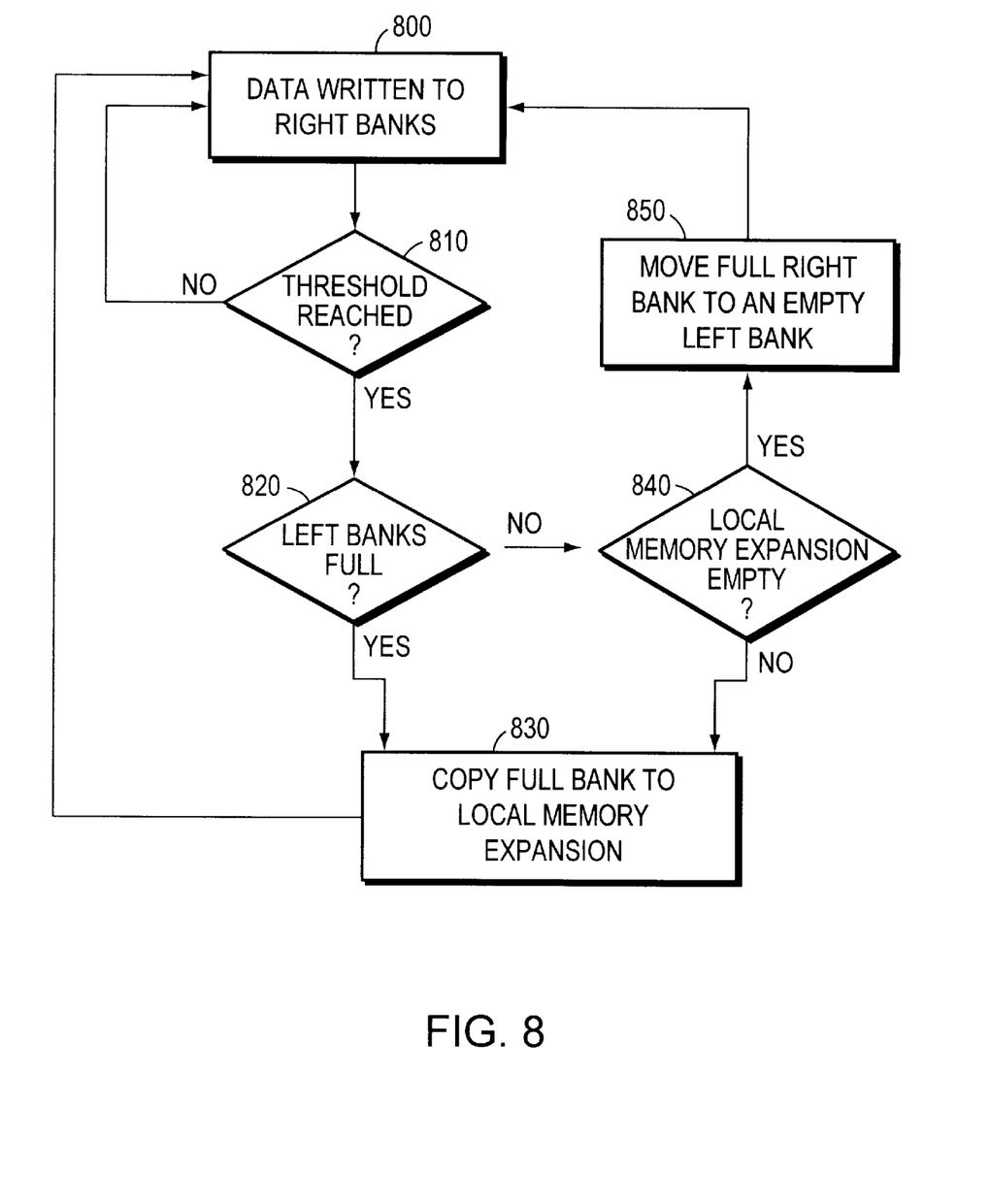
FIG. 8 is a flow chart of the write operation of the delayed FIFO.

FIG. 8 is a flow chart of the write operation of the delayed FIFO 600 controlled by the arbiter 620. Credits are written to bank 0 725 and bank 1 730 on the chip 710, also called the "right banks," block 800. When one of the right banks is full and the other reaches a predetermined threshold, block 810, the downstream adapter makes a determination about where to move the data, block 820. If bank 2 735 and bank 3 740 (the "left banks") are not empty, then the full right bank is copied into the local memory expansion, block 830. If at least one of the left banks is empty, then the state of the local memory expansion 720 is examined, block 840. If the local memory expansion 720 is empty, then the full right bank is moved to the empty left bank by exchanging pointers between the banks, block 850. No data is actually moved to a different location on the chip, just the pointer. If the local memory expansion is not empty, then the full right bank is copied into the local memory expansion, block 830.

From that point, the delayed FIFO 600 is a large FIFO whose middle part is in the local memory expansion 720. The head and tail of the FIFO are always kept on the chip 710.

When the local memory expansion 720 is used, credits are still written into the right banks 725, 730 (0 or 1). When one of the right banks is full, and the other bank reaches the threshold, the full bank is written to the local memory FIFO expansion 720 and the up/down counter is incremented by one. A write pointer of the FIFO expansion in local memory 723 is incremented by 8 (8 entries are needed to hold 16 credits).

Figure 9:
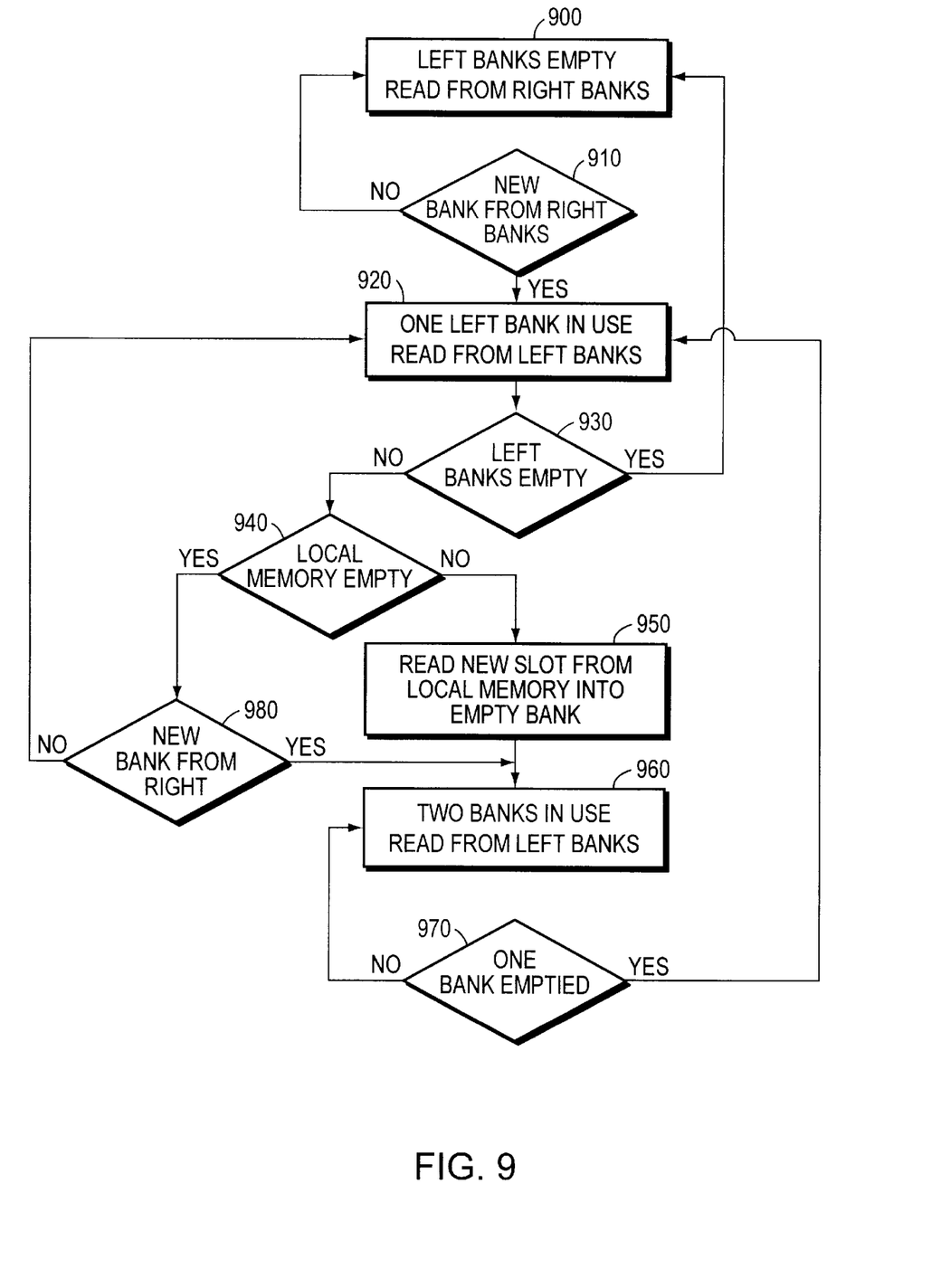
FIG. 9 is a flow chart of the read operation of the delayed FIFO.

FIG. 9 is a flow chart of the read operation of the delayed FIFO 600, controlled by the left state machine 750. At startup, the left banks 735, 740 (banks 2 and 3) are empty, and credits are read from the right banks 725, 730 (banks 0 and 1), block 900. If there is no right bank which is full or at the threshold value, decision block 910, credits are continued to be read from the right banks, block 900. If there is a right bank which is full or at the threshold value, decision block 910, the full (or threshold-level) right bank is copied to one of the left banks, i.e. a pointer is moved so that the right bank becomes a left bank. Credits are then read from the left banks, block 920. If the left banks are empty, decision block 930, the left state machine 750 returns to the startup state and reads credits from the right banks. If the left banks are not empty, decision block 930, the local memory expansion 720 is examined. If the local memory expansion 720 is not empty, decision block 940, a slot is read from the local memory expansion 720. The slot is read into an empty left bank, block 950. At this point, at least two left banks are in use and credits are read from the left banks, block 960. Credits from the left banks are continued to be read until one of the left banks is emptied, decision block 970. When one of the left banks is emptied, decision block 970, the left state machine 750 returns to the state of block 920 where one of the left banks is empty and continues to read from the left banks, block 920.

If the local memory expansion 720 is empty, decision block 940, the left state machine 750 looks for a full or threshold level right bank, decision block 980. If there is a bank copied over from the right banks, the left state machine 750 reads credits from the left banks, block 960. If there is no new bank from the right banks, the left state machine 750 reads credits from the left bank still having credits to be read, block 920.

The space of the expansion 720 in the local memory 723 is programmable. The first address is fixed (C200 Hex in the present implementation) but the length can be programmed by writing the desired value to the Control command and status register.

The chip control logic 745 translates the logical read/write pointers into the correct physical read/write pointers. In addition, other control variables identify whether the current write is to logical bank 0 or to logical bank 1 and if the current read is done from the logical "right" banks or the logical "left" banks. A third control variable determines which one of the banks inside the group is the bank to be read.

There are four physical spaces in the SRAM. Each physical space is one of the above mentioned physical parts. Each logical bank has a pointer to one of the physical parts to where it resides:

logic_ptr_0<1:0>: pointer to where logical bank #0 resides
logic_ptr_1<1:0>: pointer to where logical bank #1 resides
logic_ptr_2<1:0>: pointer to where logical bank #2 resides
logic_ptr_3<1:0>: pointer to where logical bank #3 resides
Logic_ptr_X<1:0> is the address in the physical SRAM part belonging to logical bank X (X=0, 1, 2, 3). The address inside this part (the offset in the part) is obtained from the physical part read/write pointers. For example, the physical read address in the SRAM for a credit in logical bank X is obtained as follows:
physical_read_address<5:4>=logic_ptr_X<1:0>
physical_read_address<3:0>=physical part, pointed by ptr X, read address<3:0>
and the physical write address in the SRAM for a credit in logical bank X is obtained as follows:
physical_write_address<5:4>=logic_ptr_X<1:0>
physical_write_address<3:0>=physical part, pointed by ptr X, write address<3:0>

The activate FIFO is written to by the packet assembly machine (PAM) when it moves a VC from a stalled queue to the active queue. When a VC is in the stalled queue its credits are not returned but are counted. When the packet assembly machine moves the VC to the active queue it writes to that FIFO the credit ID plus the number of credits to return. This FIFO has two entries.

Other Embodiments

The expanded FIFO has been described in the context of credit-based flow control in ATM networks, however, the present invention may be applied wherever a large FIFO is needed. The present invention can be applied to other types of network protocols such as Ethernet, FDDI, and token ring. The FIFO may be used to store data packets rather than credits.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. An apparatus for receiving and transmitting data, comprising:
   a first memory;
   a second memory that is not physically part of said first memory;
   means, responsive to reception of data, for writing an entry to a list, said list being maintained as a queue;
   means for maintaining a first end and a second end of said queue in said first memory, said first end having a next entry to be written thereto, said second end having a next entry to be read therefrom; and
   means for maintaining a middle portion of said queue in said second memory where entries to said queue are passed from said first memory to said second memory and back to said first memory as said entries are passed along said queue.

2. The apparatus of claim 1 wherein said first memory is implemented in a semiconductor chip.

3. The apparatus of claim 2 wherein said first memory is a plurality of logical banks implemented in said semiconductor chip.

4. The apparatus of claim 2 wherein said second memory is a local memory.

5. An apparatus for receiving and transmitting data, comprising:
   a semiconductor chip for implementing logic for storing data;
   means, responsive to reception of data, for adding an entry to a list, said list being maintained as a queue;
   means for maintaining a first end of said queue in said semiconductor chip, said first end having a next entry to be written thereto;
   means for maintaining a second end of said queue in said semiconductor chip, said second end having a next entry to be read, for transmitting data;
   means for maintaining a middle portion of said queue in a local memory, said local memory not being physically part of said semiconductor chip.

6. The apparatus as in claim 5 further comprising:
   means for said semiconductor chip to transfer a plurality of entries in said queue to said local memory during one access to said local memory.

7. A node comprising:
   means for establishing a plurality of virtual circuits through said node;
   a semiconductor chip for implementing logic for operating said plurality of virtual circuits, and for storing data;
   means, upon receipt of a packet in a first virtual circuit of said plurality of virtual circuits, to receive said packet into a buffer;
   means, responsive to reception of said packet, to add an entry to a list of virtual circuits, said list being maintained for returning a credit to a source node of said packet, said credit granting permission to said source node to send another packet in said first virtual circuit;
   means for maintaining a first end of said list of credits in said semiconductor chip, said first end having a next entry to be written thereto;
   means for maintaining a second end of said list of credits in said semiconductor chip, said second end having a next entry to be read, for sending a next credit message in a next cell of any virtual circuit; and
   means for maintaining a middle portion of said list of credits in a local memory, said local memory not being physically part of said semiconductor chip.

8. A method for storing data in a computerized data store, comprising the steps of:
   providing one or more first logical data banks on a semiconductor chip, said first banks to receive data into a front end of a FIFO queue;
   providing one or more second logical data banks on a semiconductor chip, said second banks to transmit data from a back end of said FIFO queue;
   providing a memory expansion in a local memory connected to said semiconductor chip, said local memory not being physically part of said semiconductor chip, said memory expansion forming a middle portion of said FIFO queue;

writing data to said first banks; and determining, when said first banks are written to a predetermined threshold level, to move one of said first banks to said second banks if at least one of said second banks is empty and said memory expansion is empty, to move one of said first banks to said memory expansion if at least one of said second banks is empty and said memory expansion is not empty, or to move one of said first banks to said memory expansion if said second banks are not empty.

9. The method of claim 8 further comprising the steps of:

reading data from said FIFO queue where data is read from said first banks if said second banks are empty, and from said second banks if said second banks are not empty; and moving data from said memory expansion if one of said second banks is empty and said memory expansion is not empty.

* * * * *